Nov. 11, 1969   H. WYSSBROD   3,477,415
ROTARY PISTON ENGINE
Filed Feb. 21, 1967   3 Sheets-Sheet 3

INVENTOR,
HANS  WYSSBROD
BY
Karl F. Ross
ATTORNEY

United States Patent Office 3,477,415
Patented Nov. 11, 1969

3,477,415
ROTARY PISTON ENGINE
Hans Wyssbrod, 10 Fuchsenriedweg,
2500 Biel, Bern, Switzerland
Filed Feb. 21, 1967, Ser. No. 617,572
Claims priority, application Switzerland, Feb. 23, 1966,
2,714/66
Int. Cl. F02b 57/00
U.S. Cl. 123—44                              4 Claims

ABSTRACT OF THE DISCLOSURE

A rotary-piston engine in which the crankshaft is journaled at one end in a cylinder housing and is coupled by a planetary gear at its other end with the housing such that the crankshaft rotates at twice the speed of the housing in the same sense. The planetary gear arrangement includes a fixed sun gear, a rotatable sun gear connected with the crankshaft and a pair of planetary gears on a planetary cage connected with the housing, the cage also being provided with another gear adapted to be driven by the starting motor. A stub on the housing remote from the planetary gears extends into a support shaft wherein it drives the magneto and is used to supply the cylinders with the explosive mixture.

This invention relates to a rotary-piston engine with revolving cylinders and crankshaft in which two or more cylinders are used in radial or in-line arrangement and the take-off shaft is rigidly connected to the crankshaft.

The problem which the invention sets out to solve is that of creating an internal-combustion engine which gives satisfactory power transmission at medium speeds of rotation and at a favorable efficiency without a flywheel mass of the hitherto customary proportions being required, and whose size and weight per unit output enable it to be used even in confined space conditions.

The invention is intended mainly for application to the construction of internal-combustion engines on the two-stroke and four-stroke cycles, in which the cylinders may be arranged radially or in line. The cylinders are mounted on a central housing which is radially and axially supported at both ends, while the crankshaft is supported in said central housing, so that the moving parts rotate about the same axis and in the same direction. A bevel-wheel differential gear ensures that the crankshaft rotates at twice the speed of the central housing with the cylinders, and since with this arrangement the central housing provides a flywheel mass it is possible to dispense with a special flywheel. One bevel wheel of the differential gear is rigidly connected to the engine support, while the wheel engaging it is bolted to the crankshaft, and the two intermediate bevel wheels are rotatably mounted on shafts in the central housing. Rotation of the crankshaft with this arrangement results in a rotary movement of the central housing in the same direction and at half the speed of the crankshaft.

Engines in use hitherto, and particularly two-strike engines, have had an unfavorable torque in the low-speed ranges, so that in engines of this type it was essential to use a flywheel of adequate mass, or else these engines must be run only in the higher speed ranges. The fitting of sufficiently large flywheels has drawbacks with respect to space requirements, so that two-stroke engines in particular have inevitably been run at high speeds. It is well enough known, however, that running at high speeds considerably increases the wear on various parts of the engine and also involves certain risks.

A further purpose of the invention is to obtain an engine with as low as possible a center of gravity, so that it may be installed in locations in which conventional engines present many disadvantages. An engine in accordance with the invention would be specially suitable for use, for instance, in low-draft watercraft, since the new design permits the engine to be fitted at a considerable angle of tilt without this entailing any functional drawbacks or difficulties with the constant-circulation lubrication system. This new engine is also particularly suitable for use in stationary plants for the drive of emergency generating sets, pumps, building auxiliaries and agricultural machines. In these cases it will usually take the form of a two-stroke engine.

Another important feature of the invention is that the rotation of the cylinders ensures simple and effective air cooling so that supplementary fans and their drives can be dispensed with, which again favorably affects the costs of manufacture of the engines. As conventional two-stroke engines are usually provided with supplementary fan equipment, which again usually incorporates a V-belt drive that is subject to wear and requires additional means of adjustment, the complete absence of all this supplementary equipment in the engines according to the invention offers economic advantages which are connected with increased reliability in service and with reduced attendance and maintenance.

It is also well known that in the engines presently in use the fitting of flywheels on the drive shaft causes very high bearing loads and thus inevitably rapid wear of these bearings. It is consequently necessary in conventional engines to make these bearings components very robust, which unfavorably influences the total costs and the maintenance of the units.

In an engine designed in accordance with the invention a supplementary flywheel can be basically dispensed with, inasmuch as the rotating central housing with the cylinders represents an entirely adequate flywheel mass for the stabilization of the engine speeds, while the absence of a separate flywheel also results in reduced bearing loads and reduced wear.

As noted, an engine according to the invention may be designed either as a two-stroke or as a four-stroke type, the arrangement and number of the cylinders being largely decided by the required engine output. The exhaust gases leave the cylinders through pipe branches leading into a stationary ring which is fitted in step bearings on the same axis as the engine. The central exhaust-gas discharge pipe from this collector ring may be placed either below, above or to the side of the engine, since the ring is mounted so as to be swivable. The pipes leading the exhaust gases from the cylinders are guided in the collector ring by a labyrinth seal arrangement. Auxiliary devices such as carburetors, ignition magnetos and fuel pumps are of the commercially available types, so that there is no need to make any further reference to them here.

The accompanying drawing shows by way of example the design and working method of a rotary piston engine in accordance with the invention. In the drawing.

Figure 1:
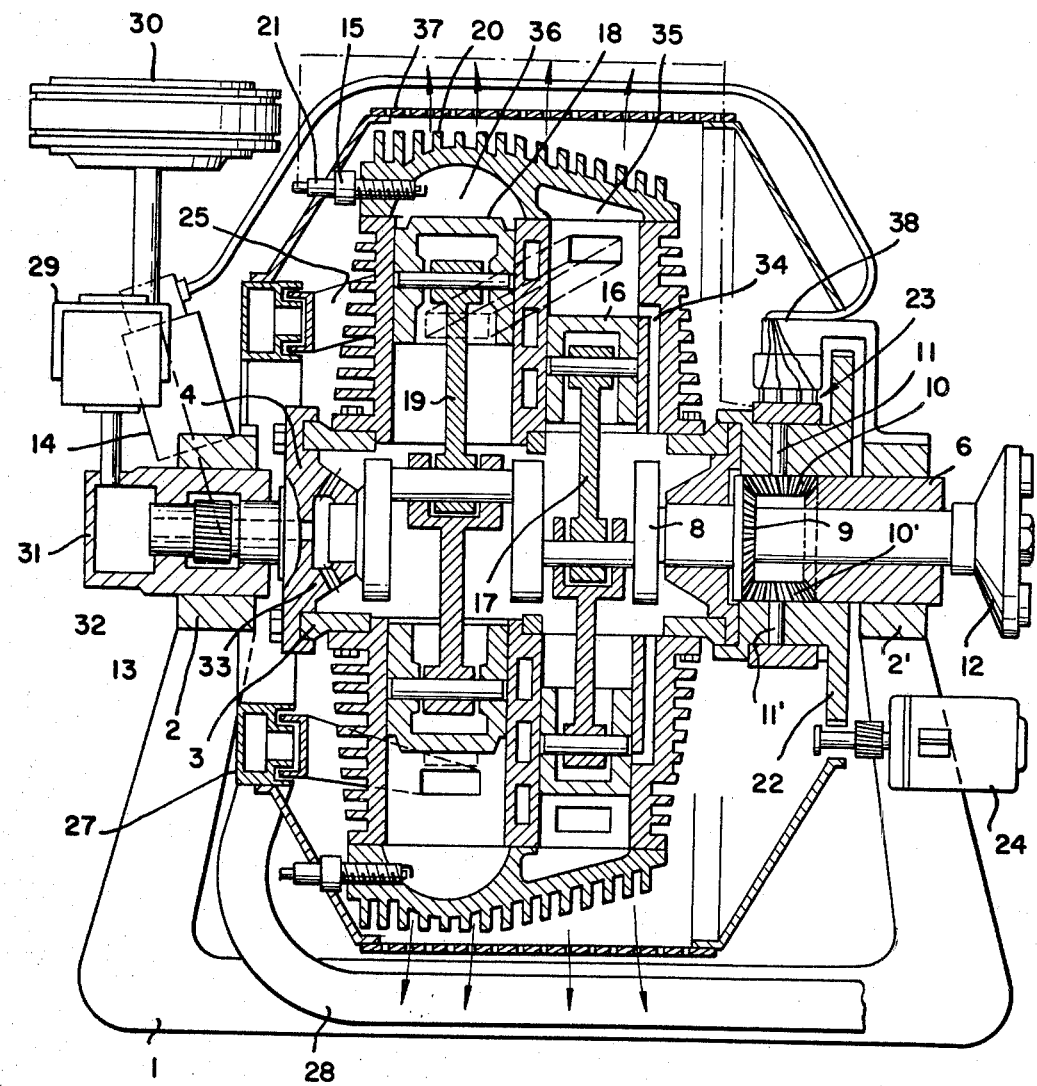
FIG. 1 shows a longitudinal section through a four cylinder two-stroke engine of radial design with a supercharger piston and a main piston.
Figure 2:
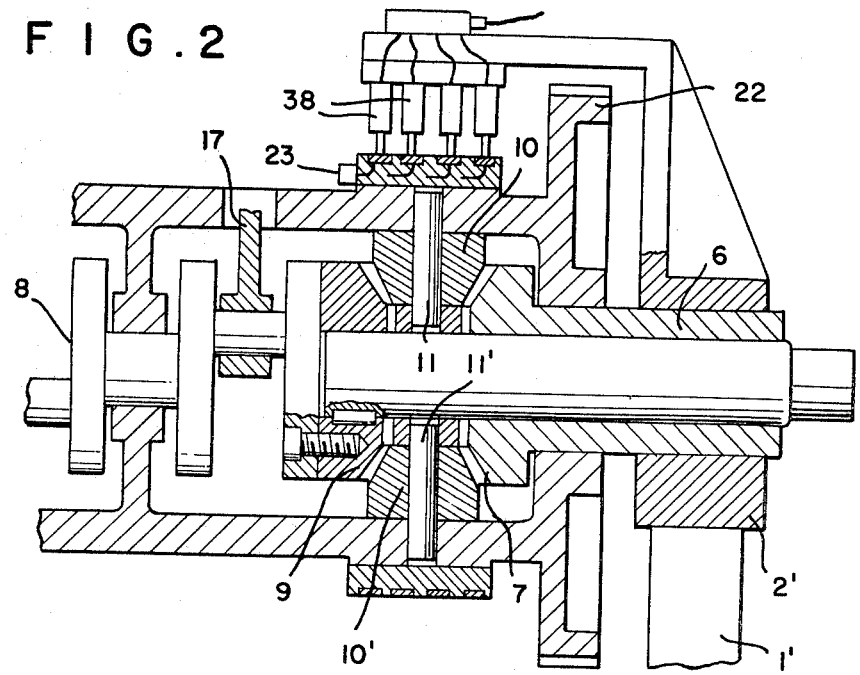
FIG. 2 shows a longitudinal section through the differential gear with crankshaft, central housing supports and slip-ring contacts for the magneto ignition.
Figure 3:
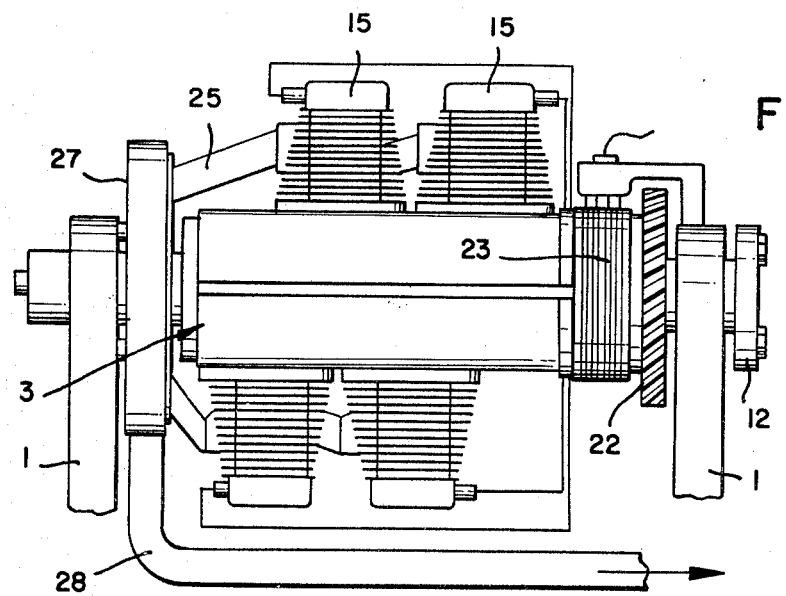
FIG. 3 is a side elevation of an engine according to the invention in the form of a four-cylinder in-line system.
Figure 4:
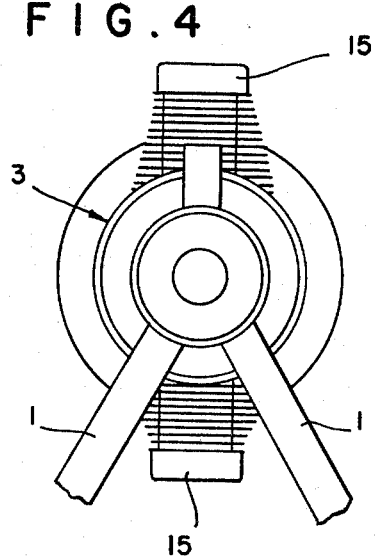
FIG. 4 is a front elevation of the engine shown in FIG. 3.
Figure 5:
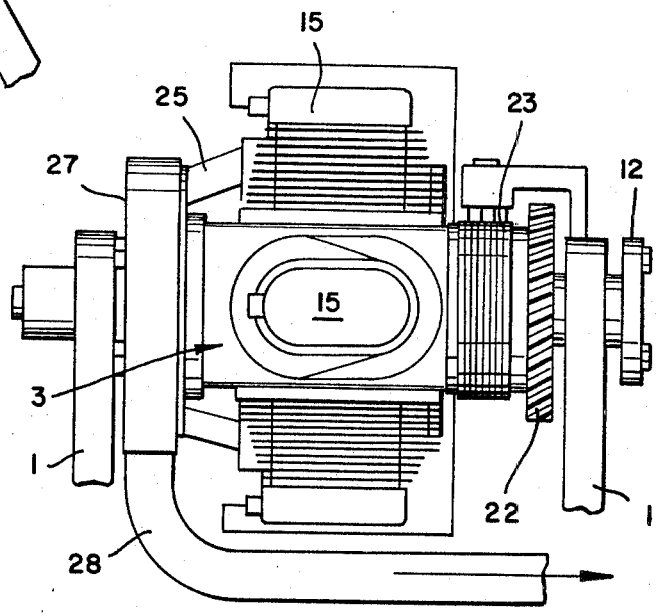
FIG. 5 is a side elevation of four-cylinder radial engine of this invention.
Figure 6:
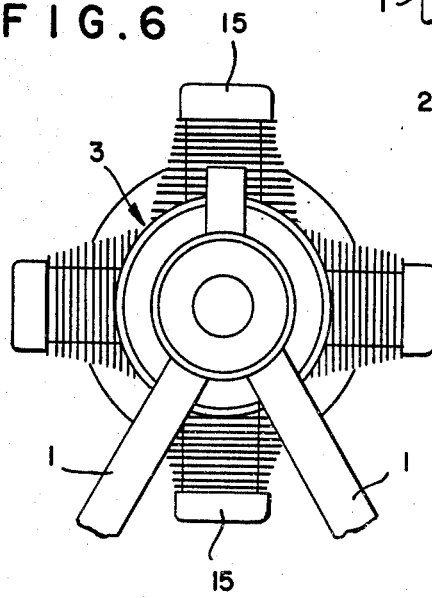
FIG. 6 is a front elevation of the engine shown in FIG. 5.

Referring to FIGS. 1 to 6, the rotary-piston engine is shown fitted horizontally and consists of the supporting frame 1 and the two-piece step bearings 2 and 2'. The central housing 3 is mounted rotatably with the step bearing 2 at one end by means of a fixing plate 4 with shaft, while at the other end it is also rotatably guided by a ring 5 fitting on a pin 6. Pin 6, which at one end is designed as a stationary bevel wheel or stationary sun gear 7, is rigidly mounted in step bearing 2', crankshaft 8 is rotatably fitted in fixing plate 4 at one end on pin 6 at the other end, which is to be regarded as the drive end. Crankshaft 8 has connected thereto a rotatable bevel wheel or sun gear 9 whose teeth cooperate with bevel wheel 7 through the two bevel wheels or planetary gears 10 and 10'. The two bevel wheels 10 and 10' are mounted on shafts 11 and 11' which in turn are mounted in a rotatable ring 5 connected with the cylinder block or housing 3. When crankshaft 8 makes a complete revolution, central housing 3 is positively turned through half a revolution in the same direction as crankshaft 8 by bevel wheels 7, 9, 10 and 10'. Crankshaft 8 is fitted at the take-off end with a coupling plate 12 for connection to a driven unit (not shown). Fixing plate 4 with shaft is equipped with gear teeth 13 for driving auxiliaries such as ignition magneto 14 and the fuel pump (not shown). The engine cylinders 15 are bolted to central housing 3 and are shown in FIG. 1 with supercharger piston 16 and piston rod 17 and with main piston 18 and its rod 19. The cylinder cover 20 with spark plug 21 is bolted to cylinder 15. The starter toothing 22 has also ring 5 connected thereto which serves as a holder for the contact ring 23 of the ignition system. The starter motor 24 is mounted on supporting frame 1. The exhaust pipes 25 from cylinders 15 lead into a labyrinth ring 26 which rotatably engages a fixed circular collector ring 27. This collector ring 27 is adjustably mounted on step bearing 2 so that the central exhaust duct 28 can be brought into various positions, say, at the top, at the side or at the bottom. The drawings show duct 28 as fitted below the engine. The fuel mixture is led from carburetor 29 with air filter 30 into the supporting sleeve 31 which is rigidly mounted in step bearing 2, then through bores 32 and 33 into central housing 3 and from there through duct 34 into precompression chamber 35, whence it passes in the engine cycle into combustion space 36. In the course of the working cycle, the pressure acting on main piston 18 turns crankshaft 8, and the positive interplay of bevel wheels 7, 9, 10, 10' set central housing 3 with cylinder 15 in rotation in the same direction as the crankshaft but at a ratio of 1:2, that is to say, when the crankshaft is running at a speed of, say 3,000 revolutions per minute the cylinder block rotates at a speed of 1,500 r.p.m. Thus a surface cooling of cylinders 15 and of the likewise rotating exhaust pipes 25 is positively brought about, and in addition there is a stabilisation of rotation by the revolving masses. A protective ring 37 having its outside part designed as a perforated plate is provided to ensure positive air circulation for cylinder cooling as well as adequate protection against accidents. FIG. 2 shows the arrangement of the sliding contacts 38 for a four-cylinder engine. FIGS. 3 and 4 show the arrangement of a rotary pistion engine with four cylinders in line; FIGS. 5 and 6 the arrangement of a four-cylinder rotary piston engine of radial design.

What I claim is:
1. A rotary-piston engine comprising:
 (a) a crankshaft journaled for rotation about an axis;
 (b) a cylinder housing centered on said crankshaft and rotatable relatively thereto and about said axis, said housing being formed with a plurality of generally radial cylinders;
 (c) corresponding pistons radially shiftable in said cylinders and coupled with said crankshaft for driving same upon reciprocation of said pistons in said cylinders whereby said pistons alternately compress an explosive mixture in each cylinder and are displaced by explosion of the compressed mixture therein;
 (d) planetary gear means coupling said housing and said crankshaft for rotation in the same sense with said crankshaft rotating at approximately twice the rotational speed of said housing, said planetary gear means comprising a fixed sun gear centered on said axis, a rotatable sun gear centered on said axis and rigid with said crankshaft, and at least two planetary gears meshing with said sun gears and journaled on said housing for rotating same;
 (e) a support shaft centered on said axis and rotatably carrying said housing and said crankshaft at one axial end thereof, said support shaft being formed with duct means communicating with said cylinders for feeding said mixture thereto;
 (f) a normally fixed collector ring centered on said axis and communicating with said cylinders for exhausting waste gases therefrom upon explosion of said mixture; and
 (g) contact means carried by said housing for initiating a firing sequence in said cylinders to ignite the compressed mixture therein.
2. A rotary-piston engine as defined in claim 1 wherein at least some of said cylinders are axially spaced apart in a common axial plane of said engine.
3. A rotary-piston engine as defined in claim 1 wherein said planetary gear means includes an annular cage carrying said planetary gears and connected with said housing at an axial end thereof remote from said support shaft, said contact means being formed on said cage, each of said cylinders being provided with a respective spark plug connected with said contact means, said support shaft being hollow and said housing having a stub rotatably received in said support shaft, said stub being formed with gear teeth within said support shaft, said engine further comprising an ignition magneto electrically connected with said contact means and driven by said gear teeth in said support shaft and with a starting motor at said other axial end of said housing, said cage being provided with a further gear operatively engageable with said starting motor for displacement of said housing and said crankshaft thereby, said crankshaft being rotatably mounted at its end remote from said planetary gear means in said housing proximal to said stub.
4. A rotary-piston engine as defined in claim 1 or claim 3 wherein said housing is formed with at least one pair of further cylinders communicating with said duct means and with the first-mentioned cylinders and provided with respective pistons radially displaceable by said crankshaft for compressing said mixture and driving same into the first-mentioned cylinders.

References Cited

UNITED STATES PATENTS 1,028,316   6/1912   Allyn.
1,061,025   5/1913   Tangeman.
1,587,275   6/1926   Behn et al.

FOREIGN PATENTS 13,163   10/1896   Switzerland.

WENDELL E. BURNS, Primary Examiner